(12) United States Patent
Schürmann et al.

(10) Patent No.: US 8,137,100 B2
(45) Date of Patent: Mar. 20, 2012

(54) INSTALLATION FOR PRODUCING CEMENT CLINKER, AND METHOD FOR OPERATING ONE SUCH INSTALLATION

(75) Inventors: Heiko Schürmann, Köln (DE); Carsten Eckert, Overath (DE)

(73) Assignee: KHD Humboldt Wedag GmbH, Cologne (DE)

( * ) Notice: Subject to any disclaimer, the term of this patent is extended or adjusted under 35 U.S.C. 154(b) by 962 days.

(21) Appl. No.: 12/095,524

(22) PCT Filed: Nov. 29, 2006

(86) PCT No.: PCT/EP2006/011453
§ 371 (c)(1),
(2), (4) Date: May 30, 2008

(87) PCT Pub. No.: WO2007/062823
PCT Pub. Date: Jun. 7, 2007

(65) Prior Publication Data
US 2010/0050906 A1   Mar. 4, 2010

(30) Foreign Application Priority Data
Dec. 1, 2005   (DE) .......................... 10 2005 057 346

(51) Int. Cl.
*F27B 15/10* (2006.01)
(52) U.S. Cl. .......................................... 432/14; 432/58

(58) Field of Classification Search .................... 432/14, 432/15, 58, 106; 106/771
See application file for complete search history.

(56) References Cited

U.S. PATENT DOCUMENTS

| | | | | |
|---|---|---|---|---|
| 4,248,639 A | * | 2/1981 | Quittkat | 106/759 |
| 4,457,705 A | * | 7/1984 | Ramesohl et al. | 432/106 |
| 4,640,681 A | * | 2/1987 | Steinbiss et al. | 432/14 |
| 5,713,734 A | | 2/1998 | Makris et al. | |
| 6,773,259 B1 | * | 8/2004 | Bech et al. | 432/14 |

FOREIGN PATENT DOCUMENTS
WO   WO 2005/059460   6/2005

* cited by examiner

*Primary Examiner* — Gregory A Wilson
(74) *Attorney, Agent, or Firm* — Greer, Burns & Crain, Ltd.

(57) ABSTRACT

A cement clinker production line with a calcining stage connected upstream of the rotary tubular kiln including an integrated calcining combustion chamber, with a CO-containing reduction zone whose size and reduction potential can be adapted to different $NO_x$ contents contained in the kiln exhaust gas and/or different types of secondary fuels used in the combustion chamber. The combustion chamber has an upper, raw-meal-free reducing zone with a feed for secondary fuels, and first tertiary partial airstream with sub-stoichiometric fuel combustion for gasifying the secondary fuels. The combustion chamber has a lower zone. The inflow for at least one raw meal partial stream and one second tertiary partial airstream are arranged in the junction region of the upper zone and the lower zone. The height (H) of the upper zone in relation to the height (h) of the lower zone has a ratio of approximately 5:1 to approximately 1:1.

12 Claims, 1 Drawing Sheet

INSTALLATION FOR PRODUCING CEMENT CLINKER, AND METHOD FOR OPERATING ONE SUCH INSTALLATION

BACKGROUND OF THE INVENTION

The invention relates to an installation for manufacturing cement clinker from raw meal which is treated thermally in a combustion process by preheating, calcining, sintering and cooling, and the exhaust gas stream of the sintering stage (rotary tubular kiln) and exhaust gas stream (tertiary air) of the cooling stage (clinker cooler) in the calcining stage which is supplied with fuel is used to calcine the raw meal, a combustion chamber with secondary fuel introduced into the upper side of the chamber and a tertiary partial airstream with sub-stoichiometric fuel combustion being integrated in the calcining stage in order to form a CO-containing reduction zone for reducing the pollutant $NO_x$, and the underside of the combustion chamber being connected via a connecting line to the lower region of the rotary kiln exhaust gas rising line. Furthermore, the invention relates to a method for operating such an installation.

Installations for manufacturing cement clinker from raw meal of the type described above which have a calcining stage which is connected upstream of the rotary tubular kiln and is double fired have to be capable of producing raw meal which is calcinated to a high degree before introduction into the rotary tubular kiln. At the same time, the manufacturers and operators of cement clinker production lines are faced with the problem of using secondary fuels and with increasingly stringent requirements for low emission values for pollutants such as $NO_x$ and CO.

In order to reduce such emissions of pollutants it is known to integrate into the calcining stage in a cement clinker production installation (specialist publication "World Cement" February 1995, article on pages 2 to 8, in particular FIGS. 1 and 7) what is referred to as an RSP calcining combustion chamber through which there is a flow from top to bottom and in the upper side of which a calcining fuel, a first tertiary partial airstream and raw meal which is preheated from the second lowest cyclone stage of the raw meal preheater, and tangentially below it a second tertiary partial airstream is blown in and causes the parties to the reaction in the combustion chamber to swirl. In the combustion chamber, the fuels are burnt sub-stoichiometrically, that is to say with a deficit of oxygen, in order to form a CO-containing reduction zone in order to reduce the pollutant $NO_x$ which has been formed in particular as a result of the high temperature burning in the rotary tubular kiln (thermal $NO_x$). For this purpose, the underside of the RSP combustion chamber is connected via a connecting line to the lower region of the rotary kiln exhaust gas rising line so that in the known cement clinker production line the CO-containing reduction zone extends from the interior of the calcining combustion chamber via the lower connecting line into the rotary kiln exhaust gas rising line and there up to the 180° tubular line manifold of the rotary kiln exhaust gas rising line because it is only there where a third tertiary partial airstream is introduced in order to burn off, by means of excess oxygen, any residue of the non-consumed CO which has remained in the entire long $NO_x$ reduction zone.

In the known cement clinker production line with the RSP calcining combustion chamber, the length of the CO-containing reduction zone cannot be readily adapted to the $NO_x$ content which is present in the rotary kiln exhaust gas and has to be reduced and/or to the type, pellet size and property of the secondary fuels used in the calcining combustion chamber.

SUMMARY OF THE INVENTION

The invention is based on the object of providing a cement clinker production line of the type described above with a calcining stage which is connected upstream of the rotary tubular kiln and has an integrated calcining combustion chamber, with the formation of a CO-containing reduction zone whose size and reduction potential can be adapted with simple means to different $NO_x$ contents present in the rotary kiln exhaust gas and/or different types, pellet sizes and properties of the secondary fuels used in the calcining combustion chamber.

In the cement clinker production line having the calcining stage according to the invention with an integrated calcining combustion chamber it is possible, by virtue of its installation engineering circuitry but also by virtue of its flexibly variable mode of operation, to adapt the reduction potential and the size and length of the CO-containing reduction zone formed in the combustion chamber to the $NO_x$ contents present in the rotary kiln exhaust gas as well as also to recycle or dispose of secondary fuels, even of different type and pellet size. This is achieved by means of the following configuration and circuitry of the calcining stage according to the invention:

The calcining combustion chamber has an upper, raw-meal-free, reducing zone with a feed for the secondary fuel arranged at the upper side of the combustion chamber, and a first tertiary partial airstream with sub-stoichiometric fuel combustion for the purpose of gasifying the secondary fuel in order to form a CO-containing synthesis gas/combustion gas or a corresponding reduction zone.

The calcining combustion chamber also has a lower zone, the inflow of at least one raw meal partial stream and of a second tertiary partial airstream being arranged in the junction region between the upper, raw-meal-free, reducing zone and the lower zone. In the context, the height of the upper, raw-meal-free zone of the combustion chamber in relation to the height of the lower zone has a ratio of approximately 5:1 to approximately 1:1.

Above the junction of the combustion chamber connecting line and the rotary kiln exhaust gas rising line, a third tertiary partial airstream line and a second raw meal partial stream lead into the rotary kiln exhaust gas rising line approximately in the upper region of the combustion chamber. The burning off of the residual CO which has not been converted and is still contained in the calcining stage as well as other incompletely burnt off fuel components can start at this point at the latest.

Each of the at least three tertiary partial airstream lines is assigned an actuating element for regulating the respective tertiary air flow rate. A plurality of modes of operation of the calcining stage according to the invention are possible:

During the starting operation of the cement clinker production line the actuating elements which are arranged on the two tertiary partial airstream lines which are connected to the combustion chamber are opened and the actuating element which is arranged in the third tertiary partial airstream line is connected at the beginning. The upper, raw-meal-free region of the combustion chamber is operated as a reducing zone and the lower region of the combustion chamber is operated as an oxidizing zone, that is to say the CO-containing synthesis gas formed in the upper zone in the calcining combustion chamber can already start to burn in the lower zone of the combustion chamber.

For the starting operation, the smaller size and the smaller reduction potential are sufficient. In contrast, during the continuous operation of the cement clinker production line the actuating element which is arranged in the second tertiary partial airstream line which is connected in the junction region between the upper reducing zone and the lower zone of the combustion chamber can be closed, while the other two actuating elements, specifically the actuating element arranged in the first tertiary partial airstream line and the actuating element arranged in the third tertiary partial airstream line are opened. During this operation, the size, length and reduction potential of the reduction zone which is produced in the combustion chamber are correspondingly enlarged.

During the continuous operation of the cement clinker production line with the calcining stage according to the invention, the excess air factor is advantageously set to $\lambda<0.40$ in the calcining combustion chamber and in the combustion chamber connecting line, to $\lambda<0.60$ in the lower region of the rotary kiln exhaust gas rising line up to the junction with the third tertiary partial airstream line, and to $\lambda>1.0$ in the upper region of the rotary kiln exhaust gas rising line downstream of the junction with the third tertiary partial airstream line.

BRIEF DESCRIPTION OF THE DRAWINGS

The invention and its further features and advantages are explained in more detail with reference to the exemplary embodiment illustrated schematically in the drawing.

DETAILED DESCRIPTION OF THE PREFERRED EMBODIMENTS

Figure 1:
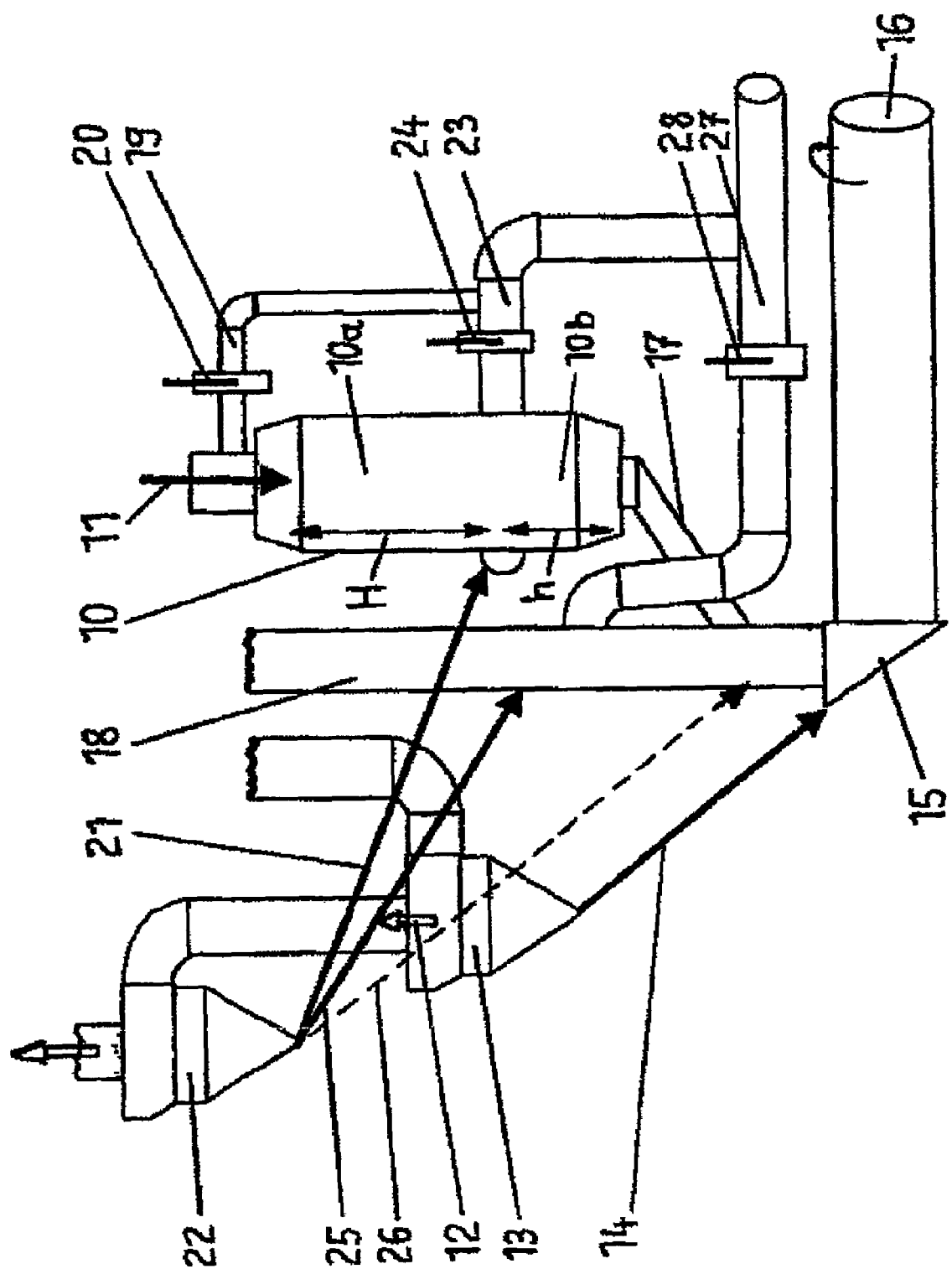

The drawing shows a detail of a cement clinker production line in the calcining stage of which a calcining combustion chamber 10 with recycling/disposal of even pelletized secondary fuels 11 is integrated, if appropriate.

The cement raw meal is fed at the top into the preheating suspension heat exchanger, where it successively travels through a plurality of cyclone stages in the combined cocurrent/countercurrent with respect to the hot exhaust gas 12 of the precalcining stage in order to be separated off from the hot exhaust gas stream 12 in the lowest cyclone 13 and introduced as high-grade (for example 95%) calcined crude cement 14 into the inflow chamber 15 of the rotary tubular kiln 16, in whose sintering zone it is burnt to form cement clinker which is subsequently cooled in a clinker cooler (not illustrated).

The exhaust gas stream of the rotary tubular kiln 16 and the tertiary air from the clinker cooler are used to calcine the raw meal in the calcining stage which is supplied with fuel. For this purpose, the combustion chamber 10 is integrated into the calcining stage, the underside of said combustion chamber 10 being connected to the lower region of the rotary kiln exhaust gas rising line 18 by means of an obliquely downward running connecting line 17.

The calcining combustion chamber 10 has an upper, raw-meal-free reducing zone 10a with a feed for the secondary fuels 11 arranged at the upper side of the combustion chamber and the connection of a first tertiary partial airstream line 19 to the actuating element 20 as well as, for example, a slide for regulating the respective tertiary air flow rate. The secondary fuels 11 are burnt sub-stoichiometrically in the combustion chamber 10 with an excess air factor $\lambda<0.8$, for example $\lambda=0.40$ for the purpose of gasifying the secondary fuels and forming a CO-containing reduction zone. The combustion chamber 10 also has a lower zone 10b, the inflow for at least one raw meal partial stream 21 from the second lowest cyclone stage 22 and the inflow for a second tertiary partial airstream line 23 with actuating element 24 being arranged in the junction region from the upper, raw-meal-free reducing zone 10a and the lower zone 10b. In the process, the height H of the upper, raw-meal-free zone 10a of the combustion chamber 10 in relation to the height h of the lower zone 10b can have a ratio of approximately 5:1 to approximately 1:1.

This dimensioning gives the reducing zone 10a with the gasification of the secondary fuels 11 space and time for the thermal processing and treatment by drying, pyrolysis and gasification of the secondary fuels 11, which may, if appropriate, also be pelletized, by providing a combustion gas with a high reduction potential whose level can be adjusted, easily and effectively by, in particular, intervening in a regulating fashion at the actuating element 24.

The sulphur gas-combustion exhaust gas solid mixture is drawn off via the combustion chamber connecting line 17 and input into the rotary kiln exhaust gas rising line 18, the solid here being a mixture of solid residual substances of the sulphurization/combustion, for example slags and residual cokes and a precalcined crude cement. The larger components of this solid mixture can, if appropriate, drop directly into the rotary kiln inflow chamber 15, while the sulphur gas combustion exhaust gas and the fine grained components of the discharged solid mixture, in particular the raw meal partial stream treated in the combustion chamber 10 can be held in suspension in the exhaust gas stream of the rotary kiln exhaust gas rising line 18 and transported there pneumatically to the lowest cyclone stage 13. Further raw meal partial streams 25, 26 coming from the second lowest cyclone stage of the raw meal preheater, and if appropriate also a further calcining fuel, can be introduced into the rotary kiln exhaust gas rising line 18.

In the upper region of the combustion chamber 10 a third tertiary partial airstream line 27 with actuating element 28 and, if appropriate, the further raw meal partial stream 25 leads into the rotary kiln exhaust gas rising line 18 at a distance above the junction with the combustion chamber connecting line 17. The burning off of the residual CO and hydrocarbons which have possibly remained unburnt as excess reducing agent in the $NO_x$ reduction zone located further downward in the rotary kiln exhaust gas rising line, for the purpose of reducing the pollutant $NO_x$ present in the rotary kiln exhaust gas, starts here at the latest. The complete burning off of the residues is ensured by the flow deflection of approximately 180° at the uppermost point of the rotary kiln exhaust gas rising line 18 and, if appropriate, also by a swirl chamber or mixing chamber which is arranged in the region of the flow deflection from the rising pipe line branch of the calcining stage into its descending pipeline branch.

The flexible mode of operation which is associated with the calcining stage according to the invention for a cement clinker production line is explained as follows:

During the starting operation of the cement clinker production line, the actuating elements 20 and 24 which are arranged in the tertiary partial airstream lines are opened, the actuating element 28 is closed at the beginning and the upper, raw-meal-free region of the combustion chamber is operated as a reducing zone 10a, and the lower region of the combustion chamber is operated as an oxidizing zone. The reduction potential which is generated here is still small, but this is sufficient for the starting operation because a high $NO_x$ reduction requirement does not yet occur in the starting operation.

In contrast, during the continuous operation of the cement clinker production line the actuating element 24 is closed, the actuating element 20 remains opened and the actuating element 28 is opened. In this operating state, the size, length and reduction potential of the reducing zone become large.

According to one exemplary embodiment the excess air factor can be set to $\lambda=0.37$ in the entire combustion chamber and in the connecting line 17, to $\lambda=0.50$ in the lower region of the rotary kiln exhaust gas rising line 18 up to the junction with the third tertiary partial airstream line, and to $\lambda>1.0$ in the upper region of the rotary kiln exhaust gas rising line 18 after the junction with the third tertiary partial airstream line 27. In this numerical example, approximately 25% of the tertiary air fed in total to the calcining stage is introduced into the combustion chamber 10, while the remaining 75% of the tertiary air is introduced directly into the rotary kiln exhaust gas rising line 18.

The actuating element 20 which is arranged in the first tertiary partial airstream line 19 is advantageously regulated as a function of the temperature in the upper reducing zone 10a of the combustion chamber 10, this temperature being held at <1100° C., which protects the lining of the combustion chamber. The excess air factor $\lambda$ is set to <0.8 so that auto thermal operation of the combustion chamber is possible.

If the secondary fuels 11 which are introduced into the combustion chamber 10 at the top and are to be recycled or disposed of are very inert, a pilot burner can also be arranged in the region of the secondary fuel inflow.

It is also possible to operate the combustion chamber 10 entirely without a raw meal inflow, i.e. to omit the above from the raw meal partial streams 21, 25, 26.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. An installation for manufacturing cement clinker from raw meal which is treated thermally in a combustion process by preheating, calcining, sintering and cooling stages, with an exhaust gas stream of the sintering stage and an exhaust gas stream of the cooling stage in the calcining stage which is supplied with fuel is used to calcine the raw meal, including a calcining combustion chamber with secondary fuel introduced into an upper side of the chamber and a tertiary partial airstream with sub-stoichiometric fuel combustion being integrated in the calcining stage in order to form a CO-containing reduction zone for reducing a pollutant $NO_x$, and an underside of the combustion chamber being connected via a connecting line to a lower region of a rotary kiln exhaust gas rising line, comprising:
   a) the calcining combustion chamber having an upper raw-meal-free reducing zone with a feed for secondary fuel arranged at the upper side of the combustion chamber, and a first tertiary partial airstream with sub-stoichiometric fuel combustion for the purpose of gasifying the secondary fuel,
   b) the combustion chamber having a lower zone, an inflow of at least one raw meal partial stream and of a second tertiary partial air stream being arranged in a junction region between the upper raw-meal-free, reducing zone and the lower zone,
   c) a height of the upper, raw-meal-free zone of the combustion chamber in relation to a height of the lower zone having a ratio of 5:1 to 1:1,
   d) a third tertiary partial airstream line and a second raw meal partial stream passing into the rotary kiln exhaust gas rising line above a junction of a combustion chamber connecting line and the rotary kiln exhaust gas rising line in the upper region of the combustion chamber, and
   e) each of the three tertiary partial airstream lines is assigned an actuating element for regulating a respective tertiary air flow rate.

2. A method for operating an installation for manufacturing cement clinker from raw meal according to claim 1, wherein during a continuous operation of the cement clinker production line the actuating element which is arranged in the second tertiary partial airstream line connected to the junction region of the upper reducing zone and the lower zone of the combustion chamber is closed, whereas the actuating element which is arranged in the first tertiary partial airstream line connected to the upper side of the combustion chamber and the actuating element which is arranged in the third tertiary partial airstream line which leads into the rotary kiln exhaust gas rising line are open.

3. The method according to claim 2, wherein during a starting operation of the cement clinker production line the actuating elements which are arranged in the tertiary partial airstream lines are opened, and the upper raw-meal-free region of the combustion chamber is operated as a reducing zone, and the lower region of the combustion chamber is operated as an oxidizing zone, and the actuating element is closed.

4. The method according to claim 2, wherein the actuating element which is arranged in the first tertiary partial airstream line is regulated as a function of the temperature in the upper, reducing zone of the combustion chamber, this temperature being kept at <1100° C.

5. The method according to claim 2, wherein during the continuous operation of the cement clinker production line an excess air factor in the combustion chamber and in the combustion chamber connecting line and in the lower region of the rotary kiln exhaust gas rising line is kept at $\lambda<0.8$.

6. The method according to claim 2, wherein during the continuous operation of the cement clinker production line an excess air factor in the combustion chamber and in the combustion chamber connecting line is set to $\lambda<0.40$, and in the lower region of the rotary kiln exhaust gas rising line up to the junction with the third tertiary partial airstream line the excess air factor is set to $\lambda<0.60$ and in the upper region of the rotary kiln exhaust gas rising line downstream of the junction with the third tertiary partial airstream line the excess air factor is set to $\lambda>1.0$.

7. An installation for manufacturing cement clinker from raw meal which is treated thermally in a combustion process by preheating, calcining, sintering and cooling stages, comprising:
   an exhaust gas stream of the sintering stage and an exhaust gas stream of the cooling stage in the calcining stage which is supplied with fuel being arranged and directed to calcine the raw meal,
   a calcining combustion chamber having an upper raw-meal-free reducing zone with a feed for secondary fuel arranged at the upper side of the combustion chamber, a first tertiary partial airstream with sub-stoichiometric fuel combustion being integrated in the calcining stage in order to form a CO-containing reduction zone to reduce a pollutant $NO_x$ and to gasify the secondary fuel, and an underside of the combustion chamber being connected via a connecting line to a lower region of a rotary kiln exhaust gas rising line,
   the combustion chamber having a lower zone, an inflow of at least one raw meal partial stream and of a second tertiary partial air stream being arranged in a junction region between the upper raw-meal-free, reducing zone and the lower zone, a height of the upper, raw-meal-free zone of the combustion chamber in relation to a height of the lower zone having a ratio of 5:1 to 1:1, a third tertiary partial airstream line and a second raw meal partial stream passing into the rotary kiln exhaust gas rising line above a junction of a combustion chamber connecting line and the rotary kiln exhaust gas rising line in the upper region of the combustion chamber, and each of the three tertiary partial airstream lines is assigned an actuating element for regulating a respective tertiary air flow rate.

8. A method for operating an installation for manufacturing cement clinker from raw meal which is treated thermally in a combustion process by preheating, calcining, sintering and cooling stages, with an exhaust gas stream of the sintering stage and an exhaust gas stream of the cooling stage in the calcining stage which is supplied with fuel being arranged and directed to calcine the raw meal, a calcining combustion chamber having an upper raw-meal-free reducing zone with a feed for secondary fuel arranged at the upper side of the combustion chamber, a first tertiary partial airstream with sub-stoichiometric fuel combustion being integrated in the calcining stage in order to form a CO-containing reduction zone to reduce a pollutant $NO_x$ and to gasify the secondary fuel, and an underside of the combustion chamber being connected via a connecting line to a lower region of a rotary kiln exhaust gas rising line, the combustion chamber having a lower zone, an inflow of at least one raw meal partial stream and of a second tertiary partial air stream being arranged in a junction region between the upper raw-meal-free, reducing zone and the lower zone, a height of the upper, raw-meal-free zone of the combustion chamber in relation to a height of the lower zone having a ratio of 5:1 to 1:1, and a third tertiary partial airstream line and a second raw meal partial stream passing into the rotary kiln exhaust gas rising line above a junction of a combustion chamber connecting line and the rotary kiln exhaust gas rising line in the upper region of the combustion chamber, and wherein each of the three tertiary partial airstream lines is assigned an actuating element for regulating a respective tertiary air flow rate, the method comprising:

during a continuous operation of the cement clinker production line the actuating element which is arranged in the second tertiary partial airstream line connected to the junction region of the upper reducing zone and the lower zone of the combustion chamber is closed, whereas the actuating element which is arranged in the first tertiary partial airstream line connected to the upper side of the combustion chamber and the actuating element which is arranged in the third tertiary partial airstream line which leads into the rotary kiln exhaust gas rising line are open.

9. The method according to claim 8, wherein during a starting operation of the cement clinker production line the actuating elements which are arranged in the tertiary partial airstream lines are opened, and the upper raw-meal-free region of the combustion chamber is operated as a reducing zone, and the lower region of the combustion chamber is operated as an oxidizing zone, and the actuating element is closed.

10. The method according to claim 8, wherein the actuating element which is arranged in the first tertiary partial airstream line is regulated as a function of the temperature in the upper, reducing zone of the combustion chamber, this temperature being kept at <1100° C.

11. The method according to claim 8, wherein during the continuous operation of the cement clinker production line an excess air factor in the combustion chamber and in the combustion chamber connecting line and in the lower region of the rotary kiln exhaust gas rising line is kept at $\lambda<0.8$.

12. The method according to claim 8, wherein during the continuous operation of the cement clinker production line an excess air factor in the combustion chamber and in the combustion chamber connecting line is set to $\lambda<0.40$, and in the lower region of the rotary kiln exhaust gas rising line up to the junction with the third tertiary partial airstream line the excess air factor is set to $\lambda<0.60$ and in the upper region of the rotary kiln exhaust gas rising line downstream of the junction with the third tertiary partial airstream line the excess air factor is set to $\lambda>1.0$.

* * * * *